United States Patent
Svensson et al.

(10) Patent No.: US 12,388,754 B2
(45) Date of Patent: Aug. 12, 2025

(54) REDUCING NETWORK CONGESTION USING A LOAD BALANCER

(71) Applicant: Telefonaktiebolaget LM Ericsson (publ), Stockholm (SE)

(72) Inventors: Fredrik Svensson, Löberöd (SE); Per Skarin, Lund (SE); Johan Eker, Lund (SE); Victor Millnert, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/051,218

(22) Filed: Oct. 31, 2022

(65) Prior Publication Data

US 2024/0146657 A1     May 2, 2024

(51) Int. Cl.
*H04L 47/125*     (2022.01)
*H04L 43/062*     (2022.01)
*H04L 47/122*     (2022.01)

(52) U.S. Cl.
CPC .......... *H04L 47/125* (2013.01); *H04L 43/062* (2013.01); *H04L 47/122* (2013.01)

(58) Field of Classification Search
CPC ....... H04L 47/11; H04L 47/12; H04L 47/122; H04L 47/125; H04L 47/129; H04L 47/74; H04L 47/743; H04L 47/745; H04L 67/1004; H04L 67/101; H04L 67/1012; H04L 67/1014; H04L 67/1008
See application file for complete search history.

(56) References Cited

U.S. PATENT DOCUMENTS

| | | | |
|---|---|---|---|
| 11,563,961 B2 * | 1/2023 | Strandby | H04N 19/436 |
| 2014/0233390 A1 * | 8/2014 | Schmid | H04W 28/0289 370/236 |
| 2015/0334179 A1 | 11/2015 | Eisenbud et al. | |
| 2015/0358236 A1 * | 12/2015 | Roach | H04L 47/22 370/235 |
| 2017/0026441 A1 * | 1/2017 | Moudy | G06F 9/5027 |
| 2017/0099346 A1 * | 4/2017 | Eisenbud | H04L 67/1008 |

(Continued)

FOREIGN PATENT DOCUMENTS

| | | | |
|---|---|---|---|
| CN | 114896070 A | * | 8/2022 |
| EP | 3328038 A1 | | 5/2018 |

OTHER PUBLICATIONS

Sun"Fair Allocation of Heterogeneous and Interchangeable Resources" (Year: 2022).*

(Continued)

*Primary Examiner* — Messeret F Gebre
(74) *Attorney, Agent, or Firm* — NICHOLSON DE VOS WEBSTER & ELLIOTT LLP

(57) ABSTRACT

Reducing network congestion using a load balancer is described. The load balancer receives network traffic for processing work for a delay-sensitive application. The load balancer is coupled with multiple application instances executing on compute nodes that are each capable of processing the work. The load balancer determines from the network traffic whether there is an indication of network congestion. If there is an indication of network congestion, the load balancer selects one of the application instances for processing the work based at least in part on reducing the network congestion. The load balancer causes the work to be processed at the selected application instance.

18 Claims, 9 Drawing Sheets

(56) References Cited

U.S. PATENT DOCUMENTS

| | | | | |
|---|---|---|---|---|
| 2017/0255496 | A1* | 9/2017 | Deng | G06F 9/4881 |
| 2017/0257319 | A1* | 9/2017 | Roch | H04L 47/11 |
| 2018/0074849 | A1* | 3/2018 | Vanka | G06F 9/505 |
| 2018/0241802 | A1* | 8/2018 | Bernat | H04L 43/0894 |

OTHER PUBLICATIONS

K. Xue, J. Han, H. Zhang, K. Chen and P. Hong, "Migrating Unfairness Among Subflows in MPTCP With Network Coding for Wired-Wireless Networks," in IEEE Transactions on Vehicular Technology, vol. 66, No. 1, pp. 798-809, Jan. 2017 (Year: 2017).*

Z. J. Haas and Z. Tian, "Congestion-Tolerant Framework for IoT Applications," 2019 IEEE 16th International Conference on Mobile Ad Hoc and Sensor Systems (MASS), Monterey, CA, USA, 2019, pp. 245-255 (Year: 2019).*

Briscoe, et al., Low Latency, Low Loss, Scalable Throughput (L4S) Internet Service:Architecture, draft-ietf-tsvwg-l4s-arch-03, Transport Area Working Group, Internet-Draft, Oct. 22, 2018, 37 pages.

B. Briscoe et al., "Low Latency, Low Loss, Scalable Throughput (L4S) Internet Service: Architecture, draft-ietf-tsvwg-14s-arch-03," Oct. 22, 2018, 63 pages, Transport Area Working Group, Internet-Draft, IETF Trust and the persons identified as the document authors.

Ball, N., et al., "Distributed content delivery using load-aware network coordinates", International Conference on Emerging Networking Experiments and Technologies—Proceedings of the 2008 Acm Conext Conference, Dec. 9, 2008, pp. 1-6.

* cited by examiner

```
                                    ⬐130
loadbalancer:
  rules:
    - nocongestion:
      - matchExpressions:
        - key: cost
          operator: In
          values:
            - Cheap
    - congestion:
      - matchExpressions:
        - key: compression
          operator: In
          values:
            - MegaCompression
```

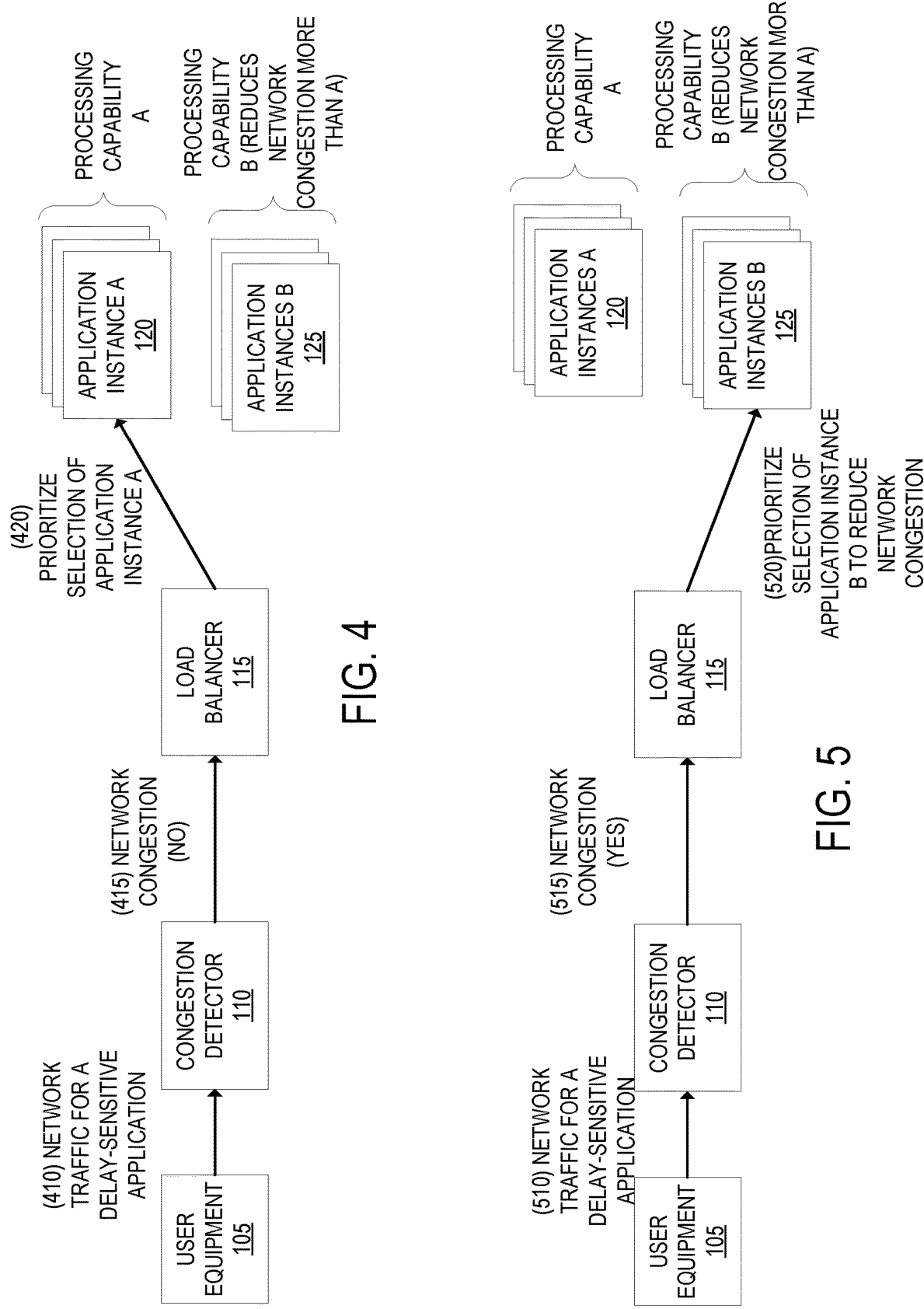

REDUCING NETWORK CONGESTION USING A LOAD BALANCER

FIELD

Embodiments of the invention relate to the field of network processing; and more specifically, to reducing network congestion using a load balancer.

BACKGROUND

Load balancing is used to distribute traffic across a set of nodes according to different schemas. Example schemas include distributing traffic based on the load of individual nodes or in a round robin scheme. The load balancer provides quality of service by preventing server overloads, improving application availability, and improving responsiveness. Network congestion in data networking occurs when a network node or link is carrying more data than it can handle. Network congestion is another cause for reduced quality of service.

Conventional load balancers in a cloud environment do not consider network congestion when distributing traffic among the set of nodes. Typically, these conventional load balancers use heuristics such as monitored load on the worker nodes. If the load is high, jobs are routed to a different worker node. If a service reduces the quality of its produced output, resulting in less load at a node, a conventional load balancer treats this as a load reduction allowing it to place other workloads on the node.

If the network is considered, this is isolated to the confines of the data center. Congestion problems in the transfer to the data center is left to be handled by the application.

Low Latency Low Loss Scalable Throughput (L4S) is used to indicate queue build-up in the network between a sender and a receiver. The congestion signals indicate to the sender to adjust the bit rate to meet the capacity of the established communication link.

SUMMARY

Reducing network congestion using a load balancer is described. In one aspect, a method is performed that reduces network congestion using a load balancer, the method including: receiving, at the load balancer, network traffic for processing work for a delay-sensitive application, wherein the load balancer is coupled with a plurality of application instances executing on a plurality of compute nodes that are each capable of processing the work; determining, from the received network traffic, an indication of network congestion; responsive to the determining the indication of network congestion, selecting one of the plurality of application instances for processing the work, wherein the selecting is based at least in part on reducing the network congestion; and causing the work to be processed at the selected one of the plurality of application instances. Determining the indication of network congestion from the network traffic may include analyzing Explicit Congestion Notification (ECN) data included within the network traffic. The selected one of the plurality of application instances may be capable of more efficient data encoding compared to other ones of the plurality of application instances. A first set of one or more of the plurality of compute nodes may have a first hardware capability, a second set of one or more of the plurality of compute nodes may have a second hardware capability, where the first hardware capability is capable of processing work such that less bandwidth is used for carrying network traffic responsive to the processed work as compared to the second hardware capability, and where selecting one of the plurality of application instances for processing the work may include selecting one of the plurality of application instances at the first set of the plurality of compute nodes. The work may be related to video processing, and the first hardware capability may include a graphics processing unit (GPU) or hardware accelerator that more efficiently encodes video compared to the second hardware capability that does not include a GPU or hardware accelerator. The method may further include interrupting a non-delay-sensitive task being executed on the selected one of the plurality of application instances; and resuming the interrupted non-delay-sensitive task after the work is finished executing. The selected one of the plurality of application instances for processing the work has more processing cycles available for processing the work including compressing compared to other ones of the plurality of application instances.

In further aspects, one or more embodiments of a non-transitory computer-readable medium or distributed media containing computer-executable program instructions or code portions stored thereon are disclosed for performing one or more embodiments of the methods of the present invention when executed by a processor entity of an apparatus, an electronic device, or other computing device. Further features of the various embodiments are as claimed in the dependent claims.

BRIEF DESCRIPTION OF THE DRAWINGS

The invention may best be understood by referring to the following description and accompanying drawings that are used to illustrate embodiments of the invention. In the drawings:

FIG. 4 shows an example of the load balancer prioritizing selection of an application instance when there is no network congestion according to an embodiment.

FIG. 5 shows an example of the load balancer prioritizing selection of an application instance when there is network congestion according to an embodiment.

DESCRIPTION OF EMBODIMENTS

Reducing network congestion using a load balancer is described. The load balancer can detect and react to network congestion when distributing load among worker instances. For a given work unit, the load balancer selects the instance (s) to process the work unit based at least in part on whether there is an indication of network congestion. If there is currently network congestion, the load balancer selects a worker instance that is capable of processing the work unit in such a way that network congestion is reduced without degrading the quality of experience. The determination of the network congestion may include analyzing data included within the network traffic (e.g., Explicit Congestion Notification (ECN) data).

Figure 1:
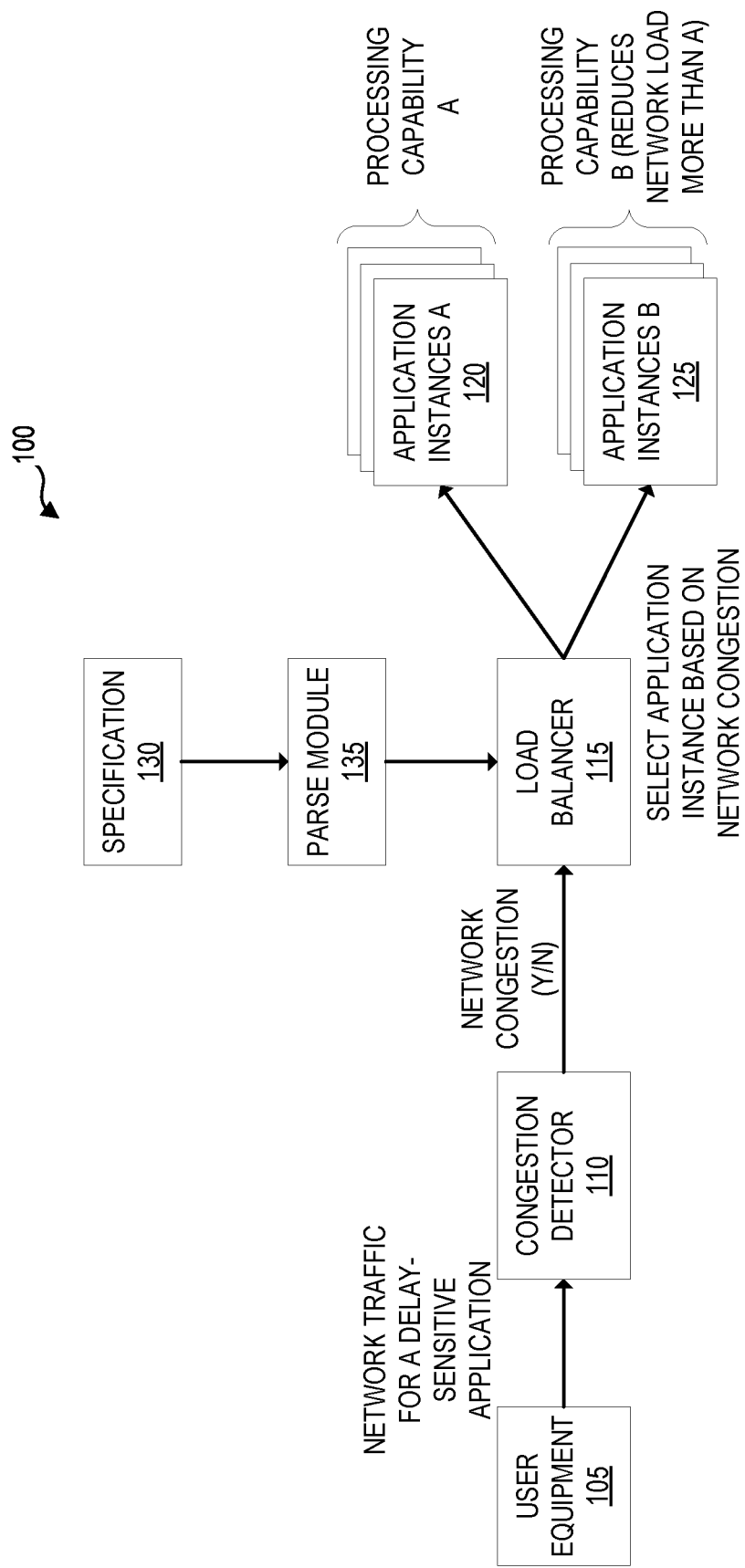
FIG. 1 is a block diagram that illustrates an exemplary system for reducing network congestion using a load balancer according to an embodiment.

FIG. 1 is a block diagram that illustrates an exemplary system for reducing network congestion using a load balancer according to an embodiment. The system 100 includes a user equipment (UE) 105, the congestion detector 110, the load balancer 115, the application instances A 120, the application instances B 125, the specification 130, and the parse module 135.

The user equipment 105 is a device that is capable, configured, arranged and/or operable to communicate with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

The congestion detector 110 detects network congestion. In an embodiment, the congestion detector 110 detects network congestion based on information provided in the network packets (e.g., in the IP layer). For example, the congestion detector 110 may analyze data included within the IP layer such as ECN data that indicates whether the network is currently experiencing network congestion. In another embodiment, the congestion detector 110 detects network congestion by observing the network traffic (e.g., the rate of requests handled, the latency of traffic and/or responses (e.g., slower rate of acknowledgements, lower number of acknowledgements), etc.). The congestion detector 110 provides data to the load balancer 115 regarding congestion status (e.g., whether the network is currently experiencing congestion). Although FIG. 1 illustrates the congestion detector 110 and the load balancer 115 as separate components, in an embodiment the functionality of the congestion detector 110 can be integrated by the load balancer 115.

The application instances A 120 and the application instances B 125 are worker instances for a delay-sensitive application or service ("delay-sensitive application") that are running in a distributed cloud computing network, sometimes referred herein as a cloud network. Example delay-sensitive applications include video streaming, video conferencing, audio streaming, remote desktop, screen sharing, remote browsing, online gaming, virtual reality, augmented reality, and extended reality. The application instances A 120 and application instances B 125 execute on compute nodes of the cloud network. The compute nodes may be physical and/or virtual compute nodes that can have different attributes and/or hardware.

The application instances A 120 and application instances B 125 have different processing capabilities that can affect network load. As an example in this description, the processing capability A leads to higher bandwidth usage (e.g., a less efficient encoding capability) and the processing capability B leads to lower bandwidth usage (e.g., a more efficient encoding capability), and each processing capability has substantially the same quality-of-experience (QoE) for the users. In an example of video streaming, the processing capability A and the processing capability B may each have the same resolution and/or frame rate but the processing capability B may have a lower bitrate due to the more efficient encoding capability. For instance, an application instance A may have a different encoding or compression with a different level of efficiency compared to the application instance B. The application instance B is therefore able to maintain, or improve, the quality of the video while reducing the bitrate at the expense of increased computational requirements. For example, when comparing the H.264 and HVEC standards, HVEC encodes more efficiently compared to H.265 but uses more processing cycles. The different processing capabilities may use the same type of encoding and/or different types of encoding. The different processing capabilities may be associated with different costs. For example, performing more efficient encoding may be more computationally expensive (which also may be more monetarily expensive) compared to performing less efficient encoding. Although FIG. 1 illustrates two categories of application instances, there may be more than two different categories of application instances in embodiments. For example, there may be N types of application instances that each perform a different type of encoding of data with a different level of efficiency, where N is two or more.

The different types of application instances may be executed on compute nodes with different hardware capabilities. For example, an application instance A 120 can execute on a compute node with a first hardware capability and an application instance B 125 can execute on a compute node with a second hardware capability. Processing using the second hardware capability can lead to less bandwidth use on the network compared to processing using the first hardware capability. As an example, compared to the first hardware capability, the second hardware capability may have faster processor(s), more processing core(s), more memory, faster memory, more available processing cycles, a dedicated graphics processing unit (GPU), hardware accelerator(s) for processing the work (e.g., field programmable gate array(s) (FPGAs), application-specific integrated circuit(s) (ASICs)), and/or faster networking components. As an example, an application instance A may perform less efficient encoding using the first hardware capability and an application instance B may perform more efficient encoding using the second hardware capability. In another embodiment, an application instance A 120 and an application instance B 125 may execute on the same compute node (e.g., with the second hardware capability).

Figures 2, 3:
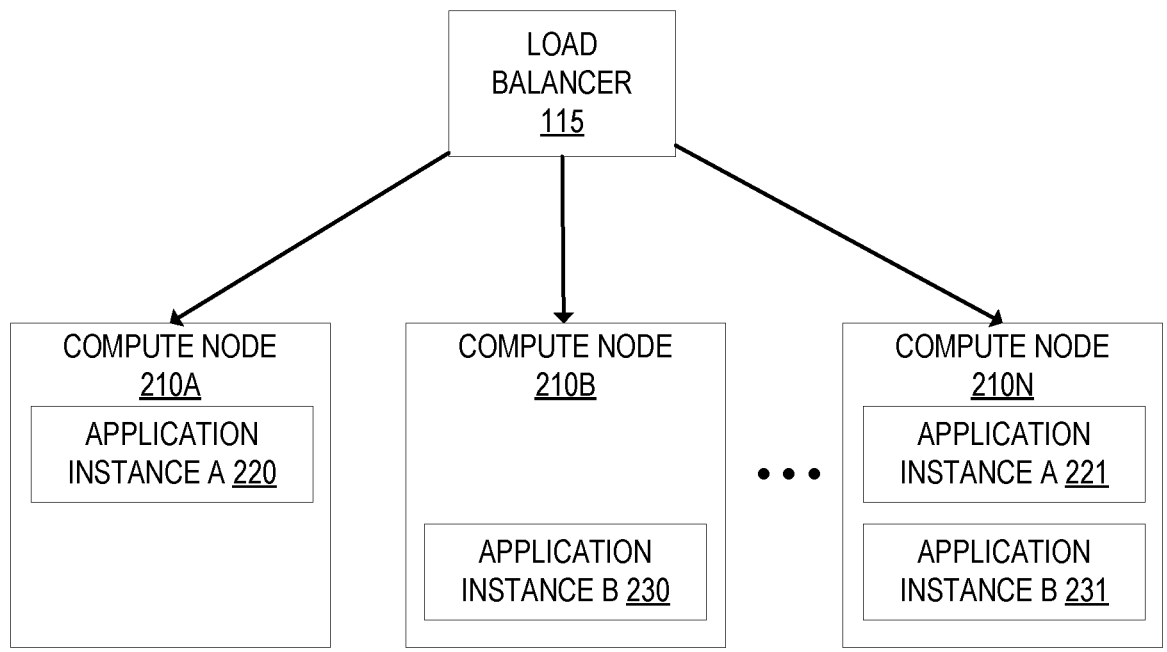
FIG. 2 is a block diagram that illustrates an exemplary architecture that shows the application instances executing on compute nodes according to an embodiment.
FIG. 3 is an example specification to be used by a load balancer for reducing network congestion according to an embodiment.

FIG. 2 is a block diagram that illustrates an exemplary architecture that shows the application instances executing on compute nodes according to an embodiment. FIG. 2 shows the compute nodes 210A-210N. The compute nodes 210A-210N may be part of the same physical device and/or across multiple physical devices. The compute nodes 210A-210N may be part of the same datacenter and/or distributed across more than one datacenter. Further, the load balancer 115 may be implemented on a server that is part of the same datacenter as the compute nodes 210A-210N. The compute node 210A executes an application instance A 220, the compute node 210B executes the application instance B 230, and a compute node 210N executes both the application instance A 221 and the application instance 231. The compute nodes 210A-210N may also execute instances that are not delay-sensitive. To say it another way, the compute nodes 210A-210N may also process work for applications that are not delay-sensitive.

The specification 130 is a deployment specification that provides configuration information regarding the processing capabilities of the application instances A 120 and application instances B 125 and what to do in case of network congestion. For instance, the specification 130 may label the application instances with their respective processing capabilities. In the example of video streaming, these labels may indicate the respective video compression capabilities of the application instances. These labels can be used by the load balancer 115 to map a request to an application instance. The parse module 135 parses the specification 130 and provides the parsed information to the load balancer 115. An example specification 130 is shown in FIG. 3, which may be written in YAML or other language.

The load balancer 115 distributes load among the application instances A 120 and application instances B 125 based at least in part on reducing network congestion. When the load balancer 115 detects a condition of network congestion (e.g., the load balancer 115 receives an indication of network congestion from the congestion detector 110), the load balancer 115 prioritizes selection of an application instance that is capable of processing the work in such a way that network congestion is reduced without degrading the QoE. For instance, the load balancer 115 prioritizes selection of an application instance B 125 when the load balancer 115 detects a condition of network congestion. If the load balancer 115 does not detect a condition of network congestion (e.g., the load balancer 115 has not received an indication of network congestion from the congestion detector 110), the load balancer 115 may prioritize selection of an application instance differently (e.g., round robin, compute load, etc.). For instance, the load balancer 115 prioritizes selection of an application instance A 120 when there is not network congestion.

The load balancer 115 causes the work to be processed at the selected application instance. For instance, the load balancer 115 transmits the network traffic to the selected application instance for processing. The load balancer 115 can include one or more rules that is a combination of a trigger and action. The trigger defines the criteria to trigger a rule. The action specifies what action to perform for the trigger. The result of the action is a list of endpoints to use when routing and load balancing data. For example, an action be a static list of IP addresses, a list of application instance names, or a list of expressions, to match certain labels. A label defines attributes and capabilities of an application instance, for example that it is capable of performing a certain compression and/or the cost of using it. In a cloud setup, the cloud exposes an API that the load balancer 115 can use to find endpoints for application instances matching these labels to route data accordingly.

The load balancer 115 may be implemented as part of a reverse proxy. The load balancer 115 may load balance the work to mitigate network congestion without the delay-service application being aware of the mitigation and/or the network congestion. In such a case, the delay-service application does not need to be modified. Further, in such a case, the application instances may not need to be modified. The load balancer 115 may perform the load balancing for a particular session periodically (e.g., after a predefined period) or upon an event occurring (e.g., change in the network).

In an embodiment, the load balancer 115 scales the number of application instances and/or nodes as a function of the congestion level. For example, if the congestion level is increasing (e.g., from low to high), the load balancer 115 scales up the number of application instances that are capable of processing the work in a way to lessen the network load; and if the congestion level is decreasing (e.g., high to low), the load balancer 115 scales down the number of application instances that are capable of processing the work in a way to lessen the network load.

FIG. 4 shows an example of the load balancer 115 prioritizing selection of an application instance when there is no network congestion and FIG. 5 shows an example of the load balancer 115 prioritizing selection of an application instance when there is network congestion.

In FIG. 4, the UE 105 transmits network traffic for a delay-sensitive application at operation 410. The delay-sensitive application is provided through an application instance running in the cloud network. As an example, the network traffic may be a request to stream a video to the UE 105. The congestion detector 110 detects whether there is network congestion. In an embodiment, the congestion detector 110 analyzes ECN data within the network traffic (e.g., within the IP layer) to determine whether there is network congestion. The congestion detector 110 indicates to the load balancer 115 whether there is network congestion. In the example of FIG. 4, at operation 415 the congestion detector 110 indicates to the load balancer 115 that there is no network congestion. Since in this example there is no network congestion, the load balancer 115 prioritizes the selection of an application instance A at operation 420. If an application instance A is not available and/or cannot be instantiated, the load balancer 115 may select an application instance B to process the work. The load balancer 115 causes the work to be processed at the selected application instance (e.g., an application instance A 120). For instance, the load balancer 115 transmits the network traffic to the selected application instance (e.g., the application instance A 120) for processing. There may be multiple application instances that meet the selection criteria. For instance, in the case where there is no indication of network congestion, there may be multiple application instances A that are available to process the work. In such a case, after selecting the type of application instance (e.g., application instance A), the load balancer 115 may select the particular application instance A that will service the work in different ways such as: performing a load balancing between those matching application instances (e.g., round robin, selecting the application instance A with the least compute load, etc.), and selecting based on which application instance A has the least latency to the requesting client computing device.

In FIG. 5, the UE 105 transmits network traffic for a delay-sensitive application at operation 510. The delay-sensitive application is provided through an application instance running in the cloud network. As an example, the network traffic may be a request to stream a video to the UE 105. The congestion detector 110 detects whether there is network congestion. In an embodiment, the congestion detector 110 analyzes ECN data within the network traffic (e.g., within the IP layer) to determine whether there is network congestion. The congestion detector 110 indicates to the load balancer 115 whether there is network congestion. In the example of FIG. 5, at operation 515 the congestion detector 110 indicates to the load balancer 115 that there is network congestion. Since in this example there is network congestion, the load balancer 115 prioritizes the selection of an application instance B at operation 520. If an application instance B is not available and/or cannot be instantiated, the load balancer 115 may select an application instance A to process the work. If an application instance A processes the work in this example, the quality of experience for the user may be degraded (e.g., there may be buffering delays, there may be a lower resolution, frame rate, and/or lower quality compression). The load balancer 115 causes the work to be processed at the selected application instance (e.g., an application instance B 125). For instance, the load balancer 115 transmits the network traffic to the selected application instance (e.g., the application instance B 125) for processing. There may be multiple application instances that meet the selection criteria. For instance, in the case of network congestion, there may be multiple application instances B that are available to process the work. In such a case, after selecting the type of application instance (e.g., application instance B), the load balancer 115 may select the particular application instance B that will service the work in different ways such as: performing a load balancing between those matching application instances (e.g., round robin, selecting the application instance B with the least compute load, etc.), and selecting based on which application instance B has the least latency to the requesting client computing device.

Figure 6:
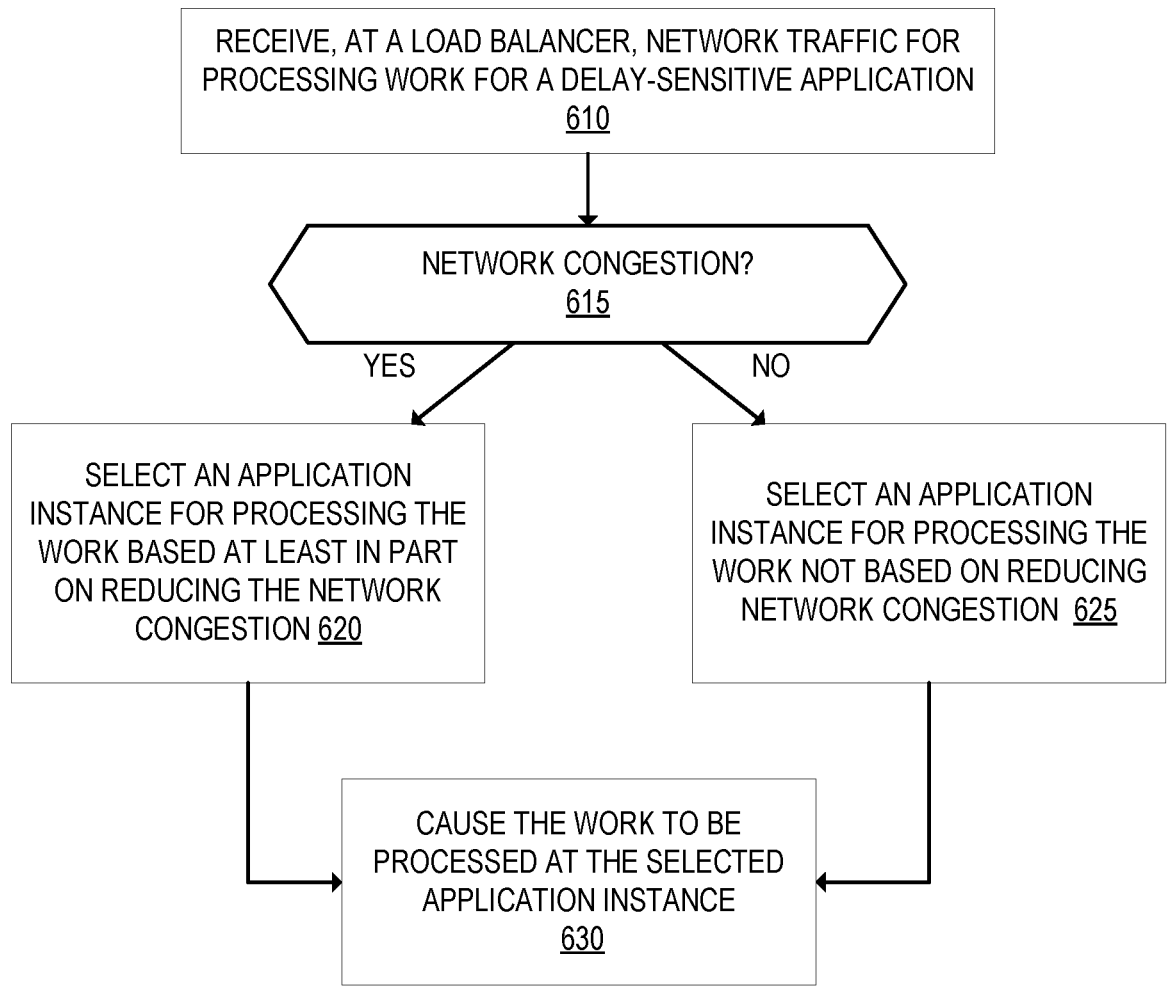
FIG. 6 is a flow diagram that illustrates exemplary operations for reducing network congestion using a load balancer according to an embodiment.

FIG. 6 is a flow diagram that illustrates exemplary operations for reducing network congestion using a load balancer according to an embodiment. The operations in FIG. 6 are described with respect to the exemplary embodiment of FIG. 1. However, the embodiment of FIG. 1 can perform operations different from that of FIG. 6, and the operations of FIG. 6 can be performed by embodiments different from that of FIG. 1.

At operation 610, the load balancer 115 receives network traffic for processing work for a delay-sensitive application. The load balancer 115 is coupled with multiple application instances executing on multiple compute nodes that are each capable of processing the work. An example of a delay-sensitive application includes video streaming, video conferencing, audio streaming, remote desktop, screen sharing, remote browsing, online gaming, virtual reality, augmented reality, and extended reality. A first set of one or more of the compute nodes may have a first hardware capability and a second set of one or more of the compute nodes may have a second hardware capability, where the first hardware capability is capable of processing work such that less bandwidth used for carrying network traffic responsive to the processed work as compared to the second hardware capability. As an example, if the work is related to video processing (e.g., video streaming), the first hardware capability may include a GPU and/or hardware accelerator(s) for processing the work that more efficiently encodes video compared to a second hardware capability that uses a CPU for encoding video.

Next, at operation 615, the load balancer 115 determines whether there is an indication of network congestion. Determining whether there is an indication of network congestion may include analyzing the network traffic including the ECN data included within the network traffic. The indication of network congestion may be received from the congestion detector 110. If the load balancer 115 determines that there is an indication of network congestion, then operation 620 is performed. If the load balancer 115 determines that there is not an indication of network congestion, then operation 625 is performed.

At operation 620, the load balancer 115 selects an application instance for processing the work based at least in part on reducing the network congestion without degrading the QoE. For instance, in the case of video processing, the load balancer 115 may select an application instance that is capable of more efficient video encoding than another one of the application instances without degrading the QoE. More efficient video encoding leads to less network load. As another example, in the case of data compression, the load balancer 115 may select an application instance that is capable of more efficient data encoding than another one of the application instances. The selected application instance may be executed on a compute node that has a hardware capability that is capable of processing the work such that less bandwidth is used for carrying network traffic responsive to the processed work as compared to another application instance being executed on another compute node that does not have the same hardware capability. The hardware capability of the compute node executing the selected application instance may have faster processor(s), more processing core(s), more memory, faster memory, more available processing cycles, a dedicated graphics processing unit (GPU), hardware accelerator(s) for processing the work (e.g., field programmable gate array(s) (FPGAs), application-specific integrated circuit(s) (ASICs)), and/or faster networking components; as compared to the hardware capability available to other application instances.

Next, at operation 630, the load balancer 115 causes the work to be processed at the selected application instance. For example, the load balancer 115 transmits the network traffic to the selected application instance for processing.

If there is no indication of network congestion, at operation 625, the load balancer 115 selects an application instance for processing the work that is not based on reducing the network congestion. For example, the selection may be based on a round-robin scheme, based on compute load, cost of the processing (e.g., the cheapest node selected). Flow then moves to operation 630.

Figure 7:
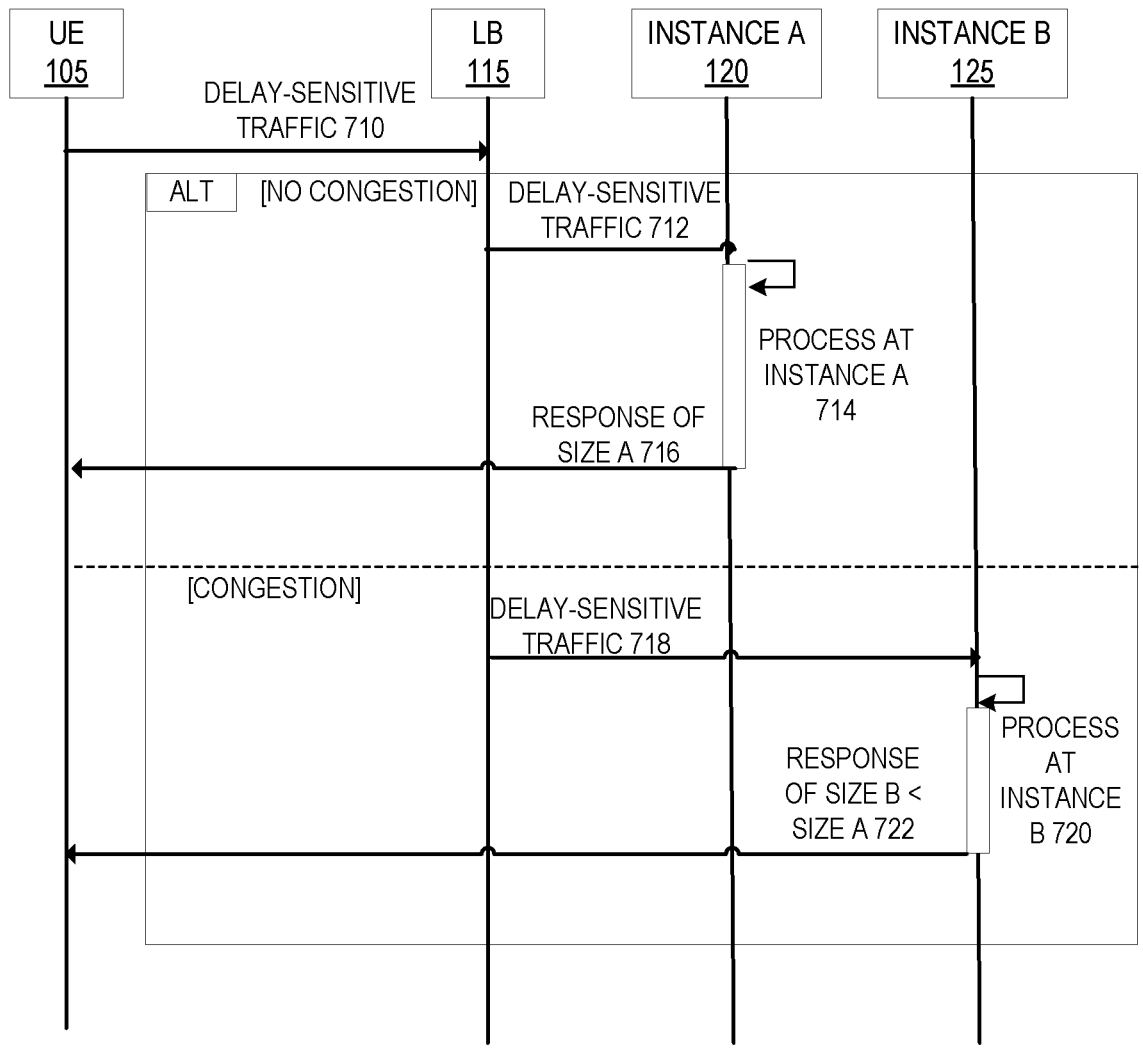
FIG. 7 is a sequence diagram that illustrates exemplary operations for reducing network congestion using a load balancer according to an embodiment.

FIG. 7 is a sequence diagram that illustrates exemplary operations for reducing network congestion using a load balancer according to an embodiment.

At operation 710, the UE 105 transmits network traffic for a delay-sensitive application. The delay-sensitive application is provided through an application instance running in the cloud network. As an example, the network traffic may be a request to stream a video to the UE 105. The network traffic is received at the load balancer 115. FIG. 7 shows exemplary operations under two alternatives: no indication of network congestion; and indication of network congestion.

If there is no indication of network congestion, the load balancer 115 prioritizes selection of an application instance based on a set of one or more factors that may not include network congestion. For instance, the load balancer 115 may select an application instance that is less costly to use but has a greater bandwidth requirement. To say it another way, if network congestion is not currently an issue, the load balancer 115 can select an application instance that is less expensive to use and has a less efficient compression mechanism (which increases bandwidth) to process the work.

In the example of FIG. 7, the load balancer 115 prioritizes the selection of an application instance A 120 when there is no indication of network congestion. That is, if an application instance A is available, the load balancer 115 will select the application instance A 120 over an application instance B 125. In an embodiment, the load balancer 115 determines whether there is an indication of network congestion based on receiving such an indication from the congestion detector 110 (not shown in this Figure) as described elsewhere herein. In the example of FIG. 7, the load balancer 115 transmits the network traffic to an instance A 120 at operation 712. The application instance A 120 processes the work at operation 714. By way of example, if the delay-sensitive application is video streaming, the application instance A 120 may encode and stream the video at a first compression level. The compression of the traffic for the delay-sensitive application by the application instance A 120 is not as efficient as the compression of the traffic for the delay-sensitive application would be if the application instance B 125 performed the work. As an example, the application instance A 120 may use a CPU to compress the traffic whereas the application instance B may use a GPU to compress the traffic. The application instance A 120 transmits a response to the UE 105 at operation 716 where the response is of a size A.

If there is an indication of network congestion, the load balancer 115 prioritizes selection of an application instance based on a set of one or more factors including network congestion. For instance, the load balancer 115 may select an application instance that is more expensive to use but has less bandwidth requirements. To say it another way, if network congestion is currently indicated, the load balancer 115 can select an application instance that has a more efficient compression mechanism (which reduces bandwidth) to process the work to help relieve the network congestion.

In the example of FIG. 7, the load balancer 115 prioritizes the selection of an application instance B 125 when there is an indication of network congestion. That is, if an application instance B 125 is available, the load balancer 115 will select the application instance B 125 over an application instance A 120. In an embodiment, the load balancer 115 determines whether there is an indication of network congestion based on receiving such an indication from the congestion detector 110 (not shown in this Figure) as described elsewhere herein. In the example of FIG. 7, the load balancer 115 transmits the network traffic to an instance B 125 at operation 718. The application instance B 125 processes the work at operation 720. By way of example, if the delay-sensitive application is video streaming, the application instance B 125 may encode and stream the video at a second compression level. The compression of the traffic for the delay-sensitive application by the application instance B 125 is more efficient as compared to the compression of the traffic by the application instance A 120. As an example, the application instance B 125 may use hardware that is able to compress the traffic more efficiently than the application instance A 120. As compared to the hardware used by an instance A 120, the hardware used by the application instance B 125 may have: a GPU versus a CPU, a faster processor, more processing cores, more memory, faster memory, more available processing cycles, hardware accelerator(s) for processing the work (e.g., field programmable gate array(s) (FPGAs), application-specific integrated circuit(s) (ASICs)), and/or faster networking components.

The application instance B 125 transmits a response to the UE 105 at operation 722 where the response is of a size B, where the size B is less than the size A.

Figure 8:
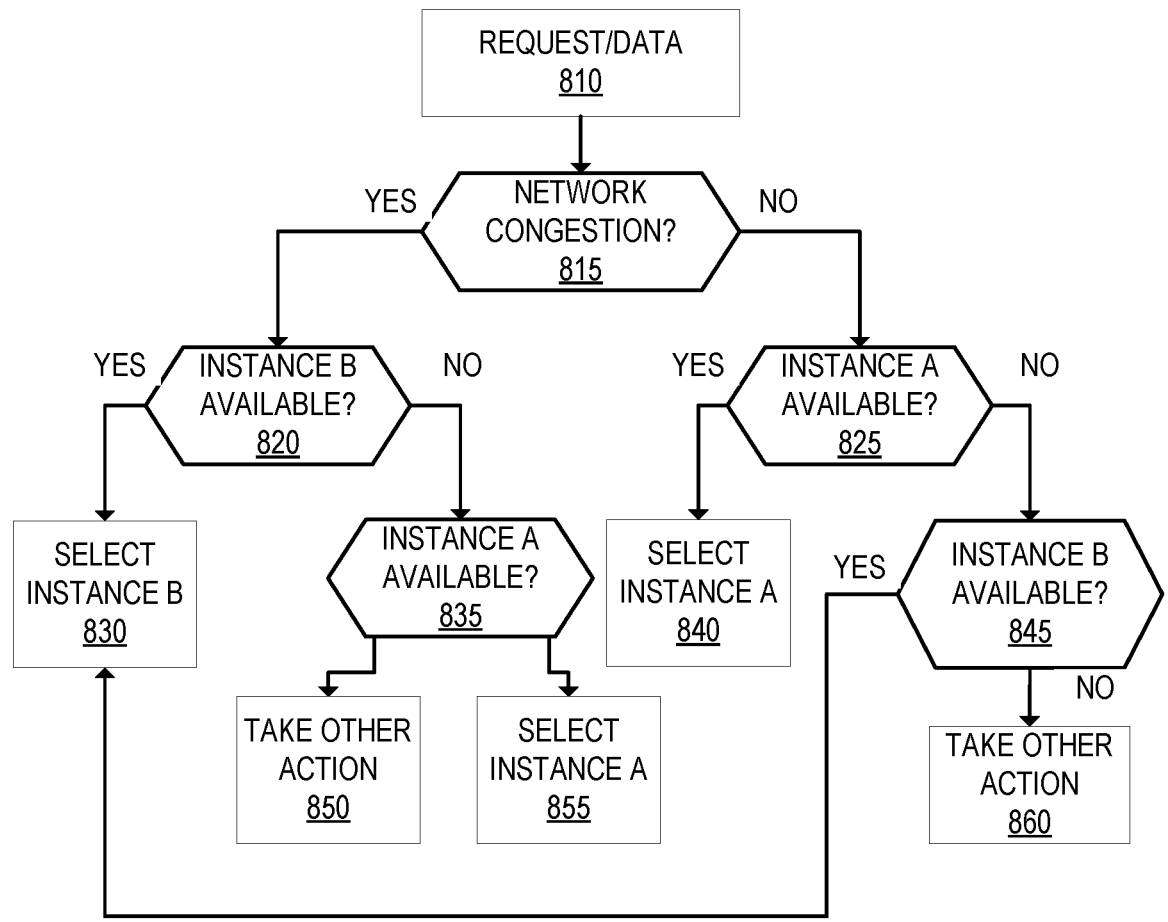
FIG. 8 is a flow diagram that illustrates exemplary operations for reducing network congestion using a load balancer according to an embodiment.

FIG. 8 is a flow diagram that illustrates exemplary operations for reducing network congestion using a load balancer according to an embodiment. The operations in FIG. 8 are described with respect to the exemplary embodiment of FIG. 1. However, the embodiment of FIG. 1 can perform operations different from that of FIG. 8, and the operations of FIG. 8 can be performed by embodiments different from that of FIG. 1. The operations of FIG. 8 show an example where there are two categories of application instances: application instance A and application instance B. Application instance B has a processing capability that reduces the network load more than if application instance A were to process the same work.

At operation 810, the load balancer 115 receives a request or data for a delay-sensitive application. The request may originate from a UE 105 or other client computing device. The delay-sensitive application is provided through an application instance running in the cloud network. As an example, the network traffic may be a request to stream a video to the UE 105.

At operation 815, the load balancer 115 determines whether there is an indication of network congestion. For example, the load balancer 115 may receive such data from the congestion detector 110. The congestion detector 110 may detect network congestion based on information included in the network packets (e.g., in the IP layer). For example, the congestion detector 110 may analyze data included within the IP layer such as ECN data that indicates whether the network is currently experiencing network congestion. If there is indication of network congestion, then operation 820 is performed. If there is not an indication of network congestion, then operation 825 is performed.

At operation 820 (network congestion is detected), the load balancer 115 determines whether an application instance B 125 is available. The load balancer 115 may determine whether an application instance B 125 is available by regularly monitoring health, readiness, and/or workload level of the application instances. The load balancer 115 may use an API to determine whether an application instance is available. The load on the network will be reduced if an application instance B 125 processes the work instead of an instance A 120. If an application instance B 125 is available, then operation 830 is performed where the load balancer 115 selects an application instance B 125 for processing the work. There may be multiple application instances B that are available. In such a case, the load balancer 115 may select the particular application instance B 125 in different ways such as: using a random selection; using a load balancing scheme (e.g., round-robin, selecting the available application instance with the least compute load, etc.); and selecting based on which application instance has the least latency to the requesting client computing device. The load balancer 115 then routes the traffic to the selected application instance B 125. The selected application instance B 125 in turn processes the work including transmitting a response to the requesting client computing device. The load on the network is reduced if the application instance B services the work instead of the application instance A. Reducing the load on the network will help mitigate the network congestion.

If an application instance B 125 is not available, then operation 835 is performed where the load balancer determines whether an application instance A 120 is available. Determining whether an application instance A 120 is available is similar to determining whether an application instance B 125 is available. If there is, then at operation 855 the load balancer 115 selects an instance A 120 for processing the work. There may be multiple application instances A that are available. In such a case, the load balancer 115 may select the particular application instance A 120 in different ways such as: using a random selection; using a load balancing scheme (e.g., round-robin, selecting the available application instance with the least compute load, etc.); and selecting based on which application instance has the least latency to the requesting client computing device. The load balancer 115 then routes the traffic to the selected application instance A 120. The selected application instance A 120 in turn processes the work including transmitting a response to the requesting client computing device. Because there is currently an indication of network congestion, servicing the work at the selected application instance A 120 may require the application instance A 120 to reduce the quality of its output which leads to a degraded QoE for the user. If an application instance A is not available, then at operation 850 other action may be taken. In such a case, the request/packets may be dropped. In other cases, the quality of the other work may be degraded until an application instance A can be brought up.

At operation 825 (network congestion is not detected), the load balancer 115 determines whether an instance A 120 is available. If there is, then at operation 840 the load balancer 115 selects an instance A 120 for processing the work. There may be multiple application instances A that are available. In such a case, the load balancer 115 may select the particular application instance A 120 in different ways such as: using a random selection; using a load balancing scheme (e.g., round-robin, selecting the available application instance with the least compute load, etc.); and selecting based on which application instance has the least latency to the requesting client computing device. The load balancer 115 then routes the traffic to the selected application instance A 120. The selected application instance A 120 in turn processes the work including transmitting a response to the requesting client computing device. Because there is not currently an indication of network congestion, the selected application instance A 120 can service the work without affecting the QoE of the user and without reducing the quality of its output. If an instance A is not available, then at operation 845 the load balancer 115 determines whether an application instance B 125 is available. In such a case, the application instance B can act as a redundant application instance for application instance A. If an application instance B is available, then flow moves back to operation 830 where the load balancer 115 selects an application instance B 125. If an application instance B is not available, then operation 860 is performed where other action may be taken. In such a case, the request/packets may be dropped.

Figure 9:
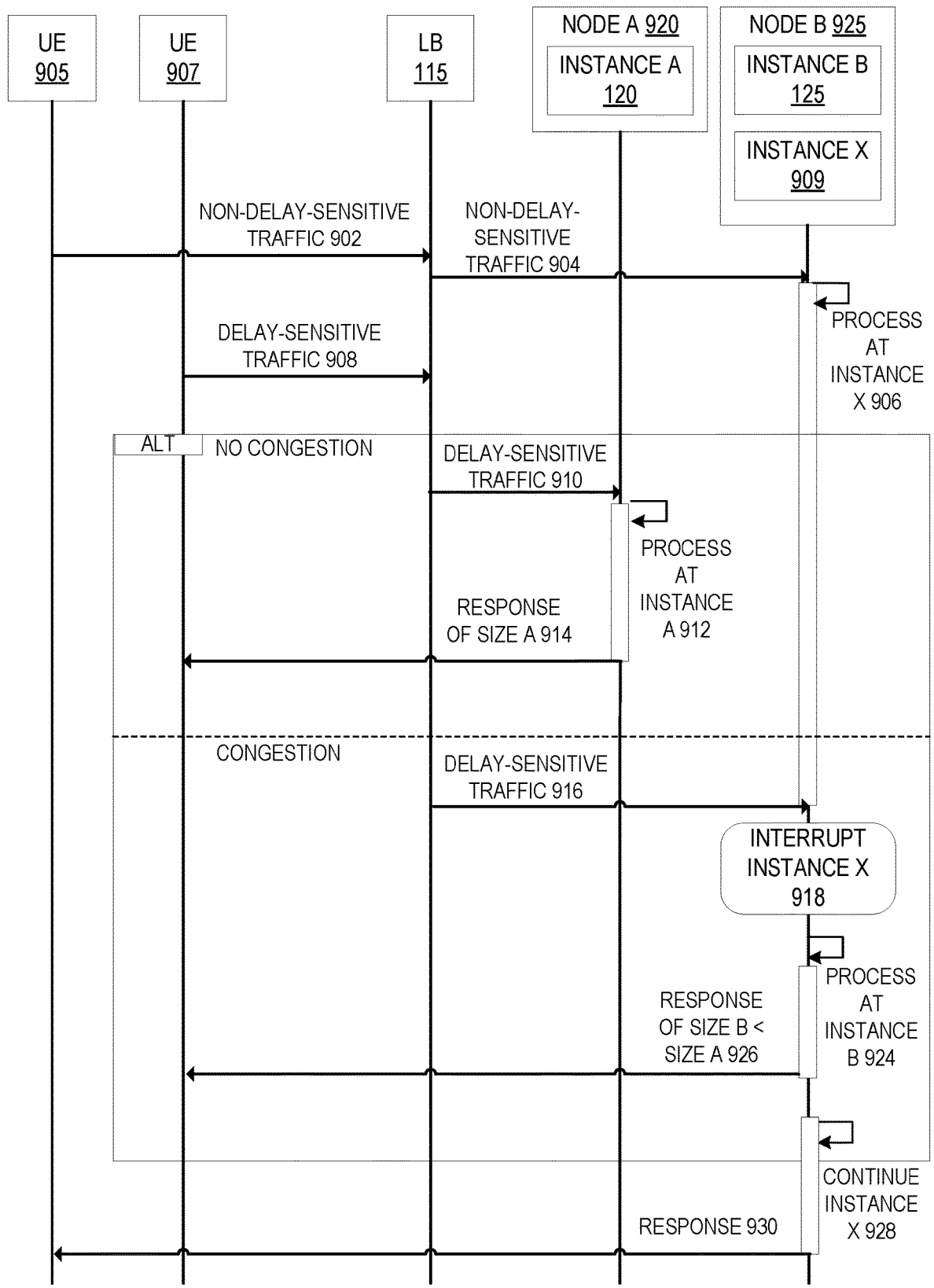
FIG. 9 is a sequence diagram that illustrates exemplary operations for reducing network congestion using a load balancer and interrupting a non-delay sensitive task according to an embodiment.

A compute node may process work for non-delay sensitive applications in addition to processing work for delay-sensitive applications. In an embodiment, processing non-delay sensitive work can be interrupted to process delay-sensitive work to reduce network congestion. FIG. 9 is a sequence diagram that illustrates exemplary operations for reducing network congestion using a load balancer and interrupting a non-delay sensitive task according to an embodiment.

At operation 902, the UE 905 transmits network traffic for a non-delay-sensitive application. This non-delay sensitive application may be provided through an instance running in the cloud network. The network traffic is received at the load balancer 115. The load balancer 115 performs a load balancing to select an instance to process the non-delay sensitive traffic. This load balancing may be, for example, round-robin, selecting the compute load with the most available resources, etc. In the example of FIG. 9, the load balancer 115 selects a worker instance X 909 that is executing on the node B 925 to process the non-delay sensitive traffic. At operation 904, the load balancer 115 transits the non-delay sensitive traffic to the node B 925 which processes the traffic at operation 906. Sometime later, the UE 907 transmits network traffic for a delay-sensitive application at operation 908. FIG. 9 shows exemplary operations under two alternatives: no indication of network congestion; and indication of network congestion.

If there is no indication of network congestion, the load balancer 115 prioritizes selection of an application instance based on a set of one or more factors that may not include network congestion. For instance, the load balancer 115 may select an application instance that is less costly to use but has a greater bandwidth requirement. To say it another way, if network congestion is not currently an issue, the load balancer 115 can select an application instance that is less expensive to use and has a less efficient compression mechanism (which increases bandwidth) to process the work.

In the example of FIG. 9, the load balancer 115 prioritizes the selection of an application instance A 120 when there is no indication of network congestion. That is, if an application instance A is available, the load balancer 115 will select the application instance A 120 over an application instance B 125. In an embodiment, the load balancer 115 determines whether there is an indication of network congestion based on receiving such an indication from the congestion detector 110 (not shown in this Figure) as described elsewhere herein. In the example of FIG. 9, the load balancer 115 transmits the network traffic to an instance A 120 at operation 910. The application instance A 120 is being executed on the compute node 920. The application instance A 120 processes the work at operation 912. By way of example, if the delay-sensitive application is video streaming, the application instance A 120 may encode and stream the video at a first compression level. The compression of the traffic for the delay-sensitive application by the application instance A 120 is not as efficient as the compression of the traffic for the delay-sensitive application would be if the application instance B 125 performed the work. As an example, the application instance A 120 may use a CPU to compress the traffic whereas the application instance B may use a GPU to compress the traffic. The application instance A 120 transmits a response to the UE 107 at operation 914 where the response is of a size A.

If there is an indication of network congestion, the load balancer 115 prioritizes selection of an application instance based on a set of one or more factors including network congestion. For instance, the load balancer 115 may select an application instance that is more expensive to use but has less bandwidth requirements. To say it another way, if network congestion is currently indicated, the load balancer 115 can select an application instance that has a more efficient compression mechanism (which reduces bandwidth) to process the work to help relieve the network congestion.

In the example of FIG. 9, the load balancer 115 prioritizes the selection of an application instance B 125 when there is an indication of network congestion. That is, if an application instance B 125 is available, the load balancer 115 will select the application instance B 125 over an application instance A 120. In an embodiment, the load balancer 115 determines whether there is an indication of network congestion based on receiving such an indication from the congestion detector 110 (not shown in this Figure) as described elsewhere herein. In the example of FIG. 9, the load balancer 115 transmits the network traffic to an instance B 125 at operation 916. The application instance B 125 is being executed on the compute node 920 which is also processing the non-delay sensitive traffic at instance X 909.

At the time of receiving the delay-sensitive traffic at operation 916, the node B 925 would not have sufficient compute resources to process the delay-sensitive work without degrading the quality of the output for the delay-sensitive application. The node B 925 interrupts or suspends the processing of the work at instance X 909 for the non-delay sensitive application to free up resources for processing the delay-sensitive application. Thus, at operation 918, the node B 925 interrupts the processing of the work at instance X 909. At operation 924, the node B 925 processes the delay-sensitive work at instance B 125. By way of example, if the delay-sensitive application is video streaming, the application instance B 125 may encode and stream the video at a second compression level. The compression of the traffic for the delay-sensitive application by the application instance B 125 is more efficient as compared to the compression of the traffic by the application instance A 120. As an example, the application instance B 125 may use hardware that is able to compress the traffic more efficiently than the application instance A 120. As compared to the hardware used by an instance A 120, the hardware used by the application instance B 125 may have: a GPU versus a CPU, a faster processor, more processing cores, more memory, faster memory, more available processing cycles, hardware accelerator(s) for processing the work (e.g., field programmable gate array(s) (FPGAs), application-specific integrated circuit(s) (ASICs)), and/or faster networking components. The application instance B 125 transmits a response to the UE 107 at operation 926 where the response is of a size B, where the size B is less than the size A.

After processing the delay-sensitive traffic, the node B 925 can resume or continue the execution of the instance X at operation 928 to process the non-delay sensitive traffic. The node B 925 transmits a response to the UE 905 at operation 930.

Figure 10:
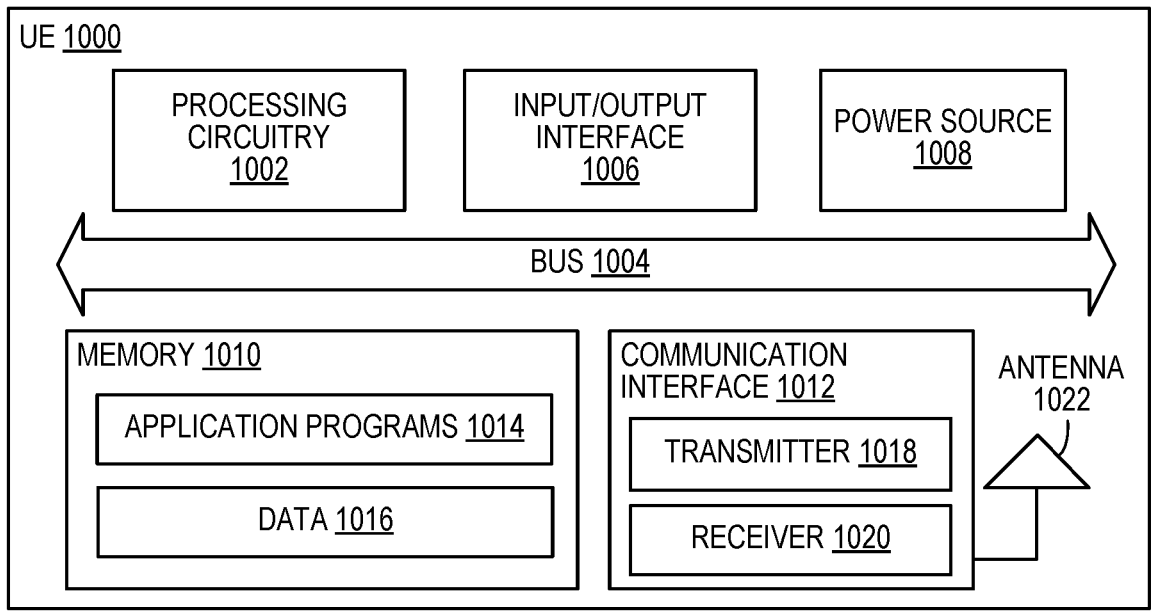
FIG. 10 shows a UE in accordance with some embodiments.

FIG. 10 shows a UE 1000 in accordance with some embodiments. The UE 105 may take the form of the UE 1000. The UE 1000 includes processing circuitry 1002 that is operatively coupled via a bus 1004 to an input/output interface 1006, a power source 1008, a memory 1010, a communication interface 1012, and/or any other component, or any combination thereof. Certain UEs may use all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 1002 is configured to process instructions and data and may be configured to implement any sequential state machine operative to execute instructions stored as machine-readable computer programs in the memory 1010. The processing circuitry 1002 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1002 may include multiple central processing units (CPUs).

In the example, the input/output interface 1006 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1000. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1008 is structured as a battery or battery pack. Other types of power sources, such as an external power source (e.g., an electricity outlet), photovoltaic device, or power cell, may be used. The power source 1008 may further include power circuitry for delivering power from the power source 1008 itself, and/or an external power source, to the various parts of the UE 1000 via input circuitry or an interface such as an electrical power cable. Delivering power may be, for example, for charging of the power source 1008. Power circuitry may perform any formatting, converting, or other modification to the power from the power source 1008 to make the power suitable for the respective components of the UE 1000 to which power is supplied.

The memory 1010 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1010 includes one or more application programs 1014, such as an operating system, web browser application, a widget, gadget engine, or other application, and corresponding data 1016. The memory 1010 may store, for use by the UE 1000, any of a variety of various operating systems or combinations of operating systems.

The memory 1010 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1010 may allow the UE 1000 to access instructions, application programs and the like, stored on transitory or non-transitory memory media, to off-load data, or to upload data. An article of manufacture, such as one utilizing a communication system may be tangibly embodied as or in the memory 1010, which may be or comprise a device-readable storage medium.

The processing circuitry 1002 may be configured to communicate with an access network or other network using the communication interface 1012. The communication interface 1012 may comprise one or more communication subsystems and may include or be communicatively coupled to an antenna 1022. The communication interface 1012 may include one or more transceivers used to communicate, such as by communicating with one or more remote transceivers of another device capable of wireless communication (e.g., another UE or a network node in an access network). Each transceiver may include a transmitter 1018 and/or a receiver 1020 appropriate to provide network communications (e.g., optical, electrical, frequency allocations, and so forth). Moreover, the transmitter 1018 and receiver 1020 may be coupled to one or more antennas (e.g., antenna 1022) and may share circuit components, software or firmware, or alternatively be implemented separately.

In the illustrated embodiment, communication functions of the communication interface 1012 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Figure 11:
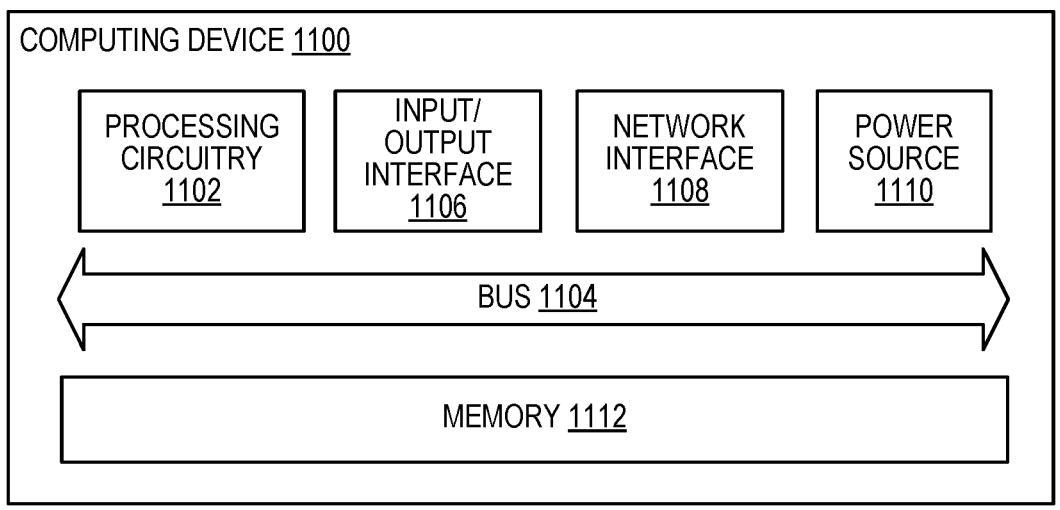
FIG. 11 is a block diagram of a computing device that may be used in some embodiments.

FIG. 11 is a block diagram of a computing device 1100 that may be used in some embodiments. One or more such computing devices may be used to implement the embodiments and operations described with respect to the congestion detector 110 and/or the load balancer 115. The computing device 1100 includes processing circuitry 1102 that is operatively coupled via a bus 1104 to an input/output interface 1106, a network interface 1108, a power source 1110, and a memory 1112. More or less components may be included in other embodiments.

The computing device 1100 stores and transmits (internally and/or with other electronic devices over a network) code (which is composed of software instructions and which is sometimes referred to as computer program code or a computer program) and/or data using machine-readable media (also called computer-readable media), such as the memory 1112. The memory 1112 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1102. The memory 1112 may store any suitable instructions, data, or information, including a computer program, software, an application including one or more of logic, rules, code, tables, and/or other instructions capable of being executed by the processing circuitry 1102 and used by the computing device 1100. The memory 1112 may be used to store any calculations made by the processing circuitry 1102 and/or any data received via the network interface 1108. For example, the memory 1112 may store program code that, when executed by the processing circuitry 1102, causes the computing device 1100 to execute the congestion detector 110 and/or the load balancer 115, and/or any of the operations performed by the same. In some embodiments, the processing circuitry 1102 and memory 1112 is integrated.

The computing device 1100 also includes one or more network interfaces 1108 (e.g., a wired and/or wireless interfaces) that allows the computing device 1100 to transmit data and receive data from other computing devices, typically across one or more networks (e.g., Local Area Networks (LANs), the internet, etc.). The computing device 1100 may also include one or more input or output ("I/O") interfaces 1106.

Figure 12:
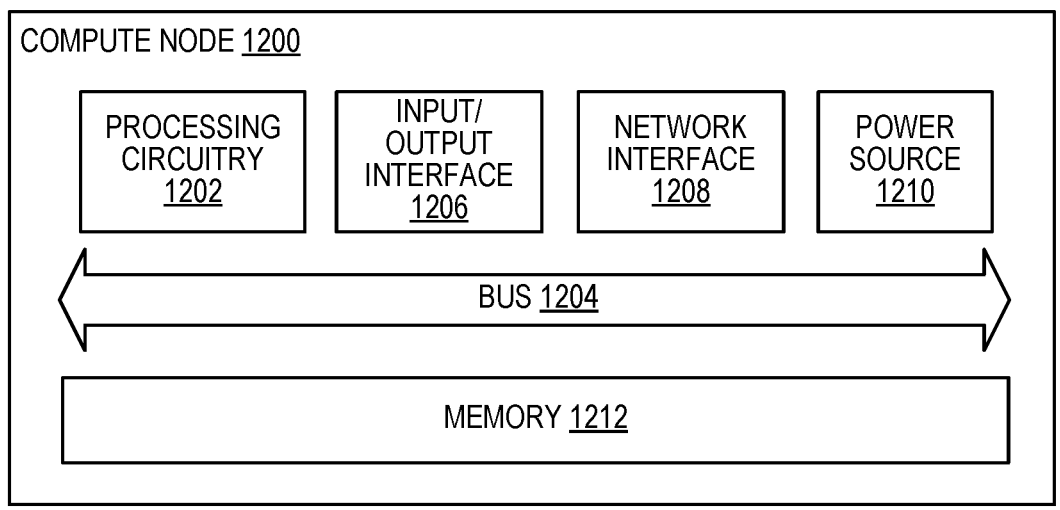
FIG. 12 is a block diagram of a compute node that may be used in some embodiments.

FIG. 12 is a block diagram of a compute node 1200, which may be an embodiment of a compute node 210A-N. The compute node 1200 includes processing circuitry 1202 that is operatively coupled via a bus 1204 to an input/output interface 1206, a network interface 1208, a power source 1210, and a memory 1212. More or less components may be included in other embodiments.

The compute node 1200 stores and transmits (internally and/or with other electronic devices over a network) code (which is composed of software instructions and which is sometimes referred to as computer program code or a computer program) and/or data using machine-readable media (also called computer-readable media), such as the memory 1212. The memory 1212 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1212 may store any suitable instructions, data, or information, including a computer program, software, an application including one or more of logic, rules, code, tables, and/or other instructions capable of being executed by the processing circuitry 1202 and used by the compute node 1200. The memory 1212 may be used to store any calculations made by the processing circuitry 1202 and/or any data received via the network interface 1208. For example, the memory 1212 may store program code that, when executed by the processing circuitry 1202, causes the compute node 1200 to execute the application instances as described herein. In some embodiments, the processing circuitry 1202 and memory 1212 is integrated.

The compute node 1200 also includes one or more network interfaces 1208 (e.g., a wired and/or wireless interfaces) that allows the compute node 1200 to transmit data and receive data from other computing devices, typically across one or more networks (e.g., Local Area Networks (LANs), the internet, etc.). The compute node 1200 may also include one or more input or output ("I/O") interfaces 1206.

Although the computing devices described herein (e.g., UEs, compute nodes, etc.) may include the illustrated combination of hardware components, other embodiments may comprise computing devices with different combinations of components. These computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the computing device, and/or performing one or more operations based on the obtained information or converted information, and as a result of said processing making a determination. Moreover, while components can be depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a network generally.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for reducing network congestion using a load balancer, the method comprising:
   receiving, at the load balancer, network traffic for processing work for a delay-sensitive application, wherein the load balancer is coupled with a plurality of application instances executing on a plurality of compute nodes that are each capable of processing the work;
   determining, from the received network traffic, an indication of network congestion;
   responsive to the determining the indication of network congestion, selecting one of the plurality of application instances for processing the work, wherein the selecting is based at least in part on reducing the network congestion without degrading output quality through a more efficient compression mechanism used by the selected one of the plurality of application instances compared to other ones of the plurality of application instances to lessen bandwidth that will be used for carrying network traffic responsive to processing the work, and wherein the selected one of the plurality of application instances is capable of processing the work such that less bandwidth is used for carrying network traffic responsive to the processed work without degrading output quality as compared to other ones of the plurality of application instances due to the more efficient compression mechanism; and
   causing the work to be processed at the selected one of the plurality of application instances.

2. The method of claim 1, wherein determining the indication of network congestion from the network traffic includes analyzing Explicit Congestion Notification (ECN) data included within the network traffic.

3. The method of claim 1, wherein a first set of one or more of the plurality of compute nodes has a first hardware capability, wherein a second set of one or more of the plurality of compute nodes has a second hardware capability, wherein the first hardware capability is capable of processing work such that less bandwidth is used for carrying network traffic responsive to the processed work as compared to the second hardware capability, and wherein selecting one of the plurality of application instances for processing the work includes selecting one of the plurality of application instances at the first set of the plurality of compute nodes.

4. The method of claim 3, wherein the work is related to video processing, and wherein the first hardware capability includes a graphics processing unit (GPU) or hardware accelerator that more efficiently encodes video including a more efficient compression mechanism compared to the second hardware capability that does not include a GPU or hardware accelerator.

5. The method of claim 1, further comprising:
   interrupting a non-delay-sensitive task being executed on the selected one of the plurality of application instances; and
   resuming the interrupted non-delay-sensitive task after the work is finished executing.

6. The method of claim 1, wherein the selected one of the plurality of application instances for processing the work has more processing cycles available for processing the work including compressing compared to other ones of the plurality of application instances.

7. A non-transitory machine-readable storage medium that provides instructions that, if executed by a processor of a load balancer, will cause said load balancer to perform operations for reducing network congestion comprising:
   receiving, at the load balancer, network traffic for processing work for a delay-sensitive application, wherein the load balancer is coupled with a plurality of application instances executing on a plurality of compute nodes that are each capable of processing the work;

determining, from the received network traffic, an indication of network congestion;

responsive to the determining the indication of network congestion, selecting one of the plurality of application instances for processing the work, wherein the selecting is based at least in part on reducing the network congestion without degrading output quality through a more efficient compression mechanism used by the selected one of the plurality of application instances compared to other ones of the plurality of application instances to lessen bandwidth that will be used for carrying network traffic responsive to processing the work, and wherein the selected one of the plurality of application instances is capable of processing the work such that less bandwidth is used for carrying network traffic responsive to the processed work without degrading output quality as compared to other ones of the plurality of application instances due to the more efficient compression mechanism; and causing the work to be processed at the selected one of the plurality of application instances.

8. The non-transitory machine-readable storage medium of claim 7, wherein determining the indication of network congestion from the network traffic includes analyzing Explicit Congestion Notification (ECN) data included within the network traffic.

9. The non-transitory machine-readable storage medium of claim 7, wherein a first set of one or more of the plurality of compute nodes has a first hardware capability, wherein a second set of one or more of the plurality of compute nodes has a second hardware capability, wherein the first hardware capability is capable of processing work such that less bandwidth is used for carrying network traffic responsive to the processed work as compared to the second hardware capability, and wherein selecting one of the application instances for processing the work includes selecting one of the plurality of application instances at the first set of the plurality of compute nodes.

10. The non-transitory machine-readable storage medium of claim 9, wherein the work is related to video processing, and wherein the first hardware capability includes a graphics processing unit (GPU) or hardware accelerator that more efficiently encodes video including a more efficient compression mechanism compared to the second hardware capability that does not include a GPU or hardware accelerator.

11. The non-transitory machine-readable storage medium of claim 7, wherein the operations further comprise:

interrupting a non-delay-sensitive task being executed on the selected one of the plurality of application instances; and resuming the interrupted non-delay-sensitive task after the work is finished executing.

12. The non-transitory machine-readable storage medium of claim 7, wherein the selected one of the plurality of application instances for processing the work has more processing cycles available for processing the work including compressing compared to other ones of the plurality of application instances.

13. A load balancer, comprising:

a processor; and a non-transitory machine-readable storage medium that provides instructions that, if executed by the processor, will cause the processor to perform operations comprising:

receiving, at the load balancer, network traffic for processing work for a delay-sensitive application, wherein the load balancer is coupled with a plurality of application instances executing on a plurality of compute nodes that are each capable of processing the work;

determining, from the received network traffic, an indication of network congestion;

responsive to the determining the indication of network congestion, selecting one of the plurality of application instances for processing the work, wherein the selecting is based at least in part on reducing the network congestion without degrading output quality through a more efficient compression mechanism used by the selected one of the plurality of application instances compared to other ones of the plurality of application instances to lessen bandwidth that will be used for carrying network traffic responsive to processing the work, and wherein the selected one of the plurality of application instances is capable of processing the work such that less bandwidth is used for carrying network traffic responsive to the processed work without degrading output quality as compared to other ones of the plurality of application instances due to the more efficient compression mechanism; and causing the work to be processed at the selected one of the plurality of application instances.

14. The load balancer of claim 13, wherein determining the indication of network congestion from the network traffic includes analyzing Explicit Congestion Notification (ECN) data included within the network traffic.

15. The load balancer of claim 13, wherein a first set of one or more of the plurality of compute nodes has a first hardware capability, wherein a second set of one or more of the plurality of compute nodes has a second hardware capability, wherein the first hardware capability is capable of processing work such that less bandwidth is used for carrying network traffic responsive to the processed work as compared to the second hardware capability, and wherein selecting one of the plurality of application instances for processing the work includes selecting one of the plurality of application instances at the first set of the plurality of compute nodes.

16. The load balancer of claim 15, wherein the work is related to video processing, and wherein the first hardware capability includes a graphics processing unit (GPU) or hardware accelerator that more efficiently encodes video including a more efficient compression mechanism compared to the second hardware capability that does not include a GPU or hardware accelerator.

17. The load balancer of claim 13, wherein the operations further comprise:

interrupting a non-delay-sensitive task being executed on the selected one of the plurality of application instances; and resuming the interrupted non-delay-sensitive task after the work is finished executing.

18. The load balancer of claim 13, wherein the selected one of the plurality of application instances for processing the work has more processing cycles available for processing the work including compressing compared to other ones of the plurality of application instances.

* * * * *